United States Patent [19]

Henttonen

[11] Patent Number: 5,050,343
[45] Date of Patent: Sep. 24, 1991

[54] METHOD AND APPARATUS FOR ARTIFICIAL IRRIGATION OF PLANTS

[76] Inventor: Martti Henttonen, Box 227, S-572 01 Oskarshamn, Sweden

[21] Appl. No.: 469,508
[22] PCT Filed: Jun. 27, 1989
[86] PCT No.: PCT/SE89/00362
§ 371 Date: Feb. 28, 1990
§ 102(e) Date: Feb. 28, 1990
[87] PCT Pub. No.: WO90/00347
PCT Pub. Date: Jan. 25, 1990

[30] Foreign Application Priority Data
Jul. 5, 1988 [SE] Sweden .................. 8802512

[51] Int. Cl.⁵ .................. A01G 25/00
[52] U.S. Cl. .................. 47/79; 47/81; 52/102
[58] Field of Search .......... 52/102; 47/79, 81, 82

[56] References Cited
U.S. PATENT DOCUMENTS 3,603,034  9/1971  Maxwell-Stewart .......... 47/79
4,397,114  8/1983  Skaife .................. 47/81
4,761,923  8/1988  Reum et al. ............. 52/102
4,910,910  3/1990  Jones .................. 52/102 X Primary Examiner—David A. Scherbel
Assistant Examiner—Linda J. Watson

[57] ABSTRACT

A method and an apparatus for artificial irrigation of a ground area or one or several pots having plants, and comprising an irrigation tube system or an irrigation hose system containing water and eventually a fertilizer and other growth promoting and/or illness preventing substances, and several water soaking feet containing earth, or wicks for soaking and transmitting water etc. to the earth above said feet or wick, and in which the irrigation system comprises a tube or hose formed with one or more smooth tube parts and one or more flexible tube parts, means for forming a closed irrigation tube system or hose system by bowing the tubes or hoses along the flexible tube or hose parts thereby giving the irrigation tube system the intended formation, and by interconnecting the ends of the tubes or hoses under sealed condition. Holes for water soaking feet, wicks or water supply tubes can be pressed open following hole indications of the smooth and eventually also the flexible tube parts.

8 Claims, 5 Drawing Sheets

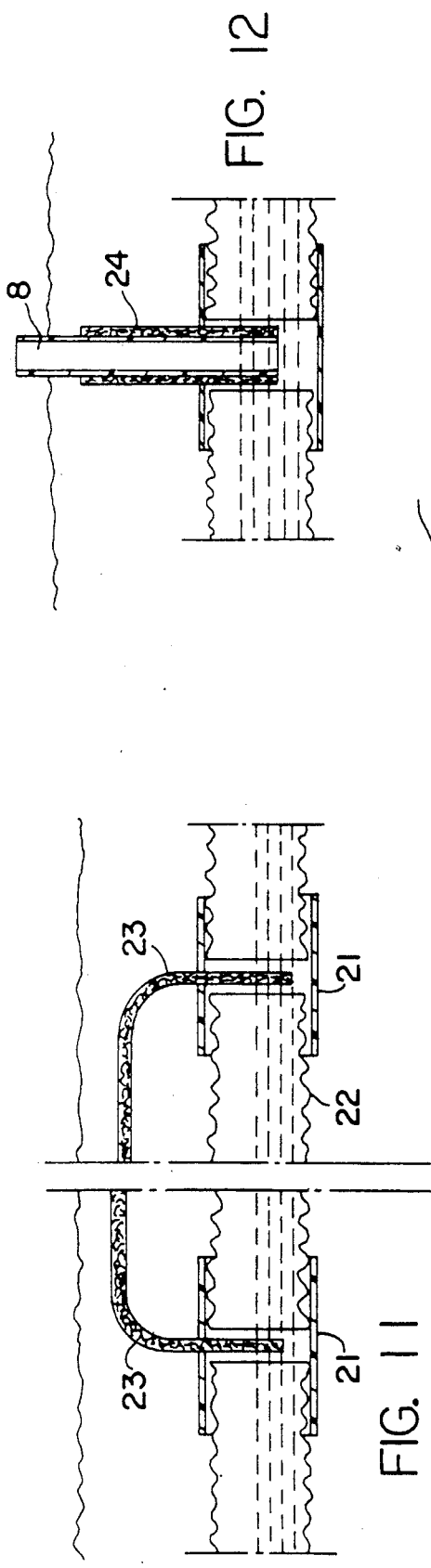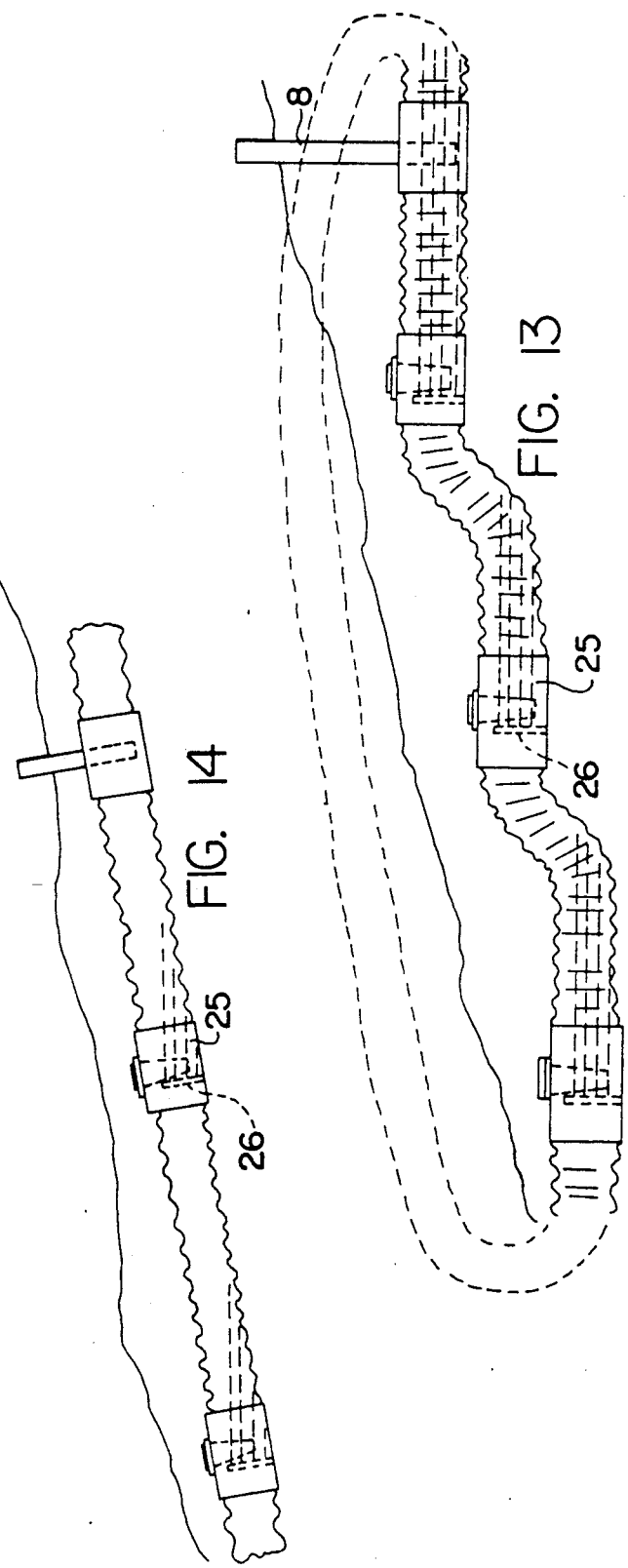

METHOD AND APPARATUS FOR ARTIFICIAL IRRIGATION OF PLANTS

The present invention generally relates to a method and an apparatus for artificial irrigation of plants, both plants in pots and in the free earth and in stationary cultivation apparatus located above the ground or in the earth, and the invention is more particularly directed to such a method and such an apparatus, by means of which it is possible to form a closed irrigation loop by interconnecting a few numbers of tube or hose from standard components, which loop can after by choice provide a system whereby it is possible to irrigate a large or a small size area.

It is known for instance from the U.S. Pat. No. 2,346,029 to provide an irrigation apparatus in the form of a tube formed irrigation loop, whereby a tube having several spaced perforations, and having an inner wick is placed in the earth under the area to be irrigated, and the wick is put in contact with a source of water for soaking up water and transmitting it into the earth.

A, wick system is normally not capable of transporting water by a capillary action over long distances. Furthermore, the amount of water which is supplied by the wick decreases proportionately according to the distance from the source of water. This means that plants located close to the source of water irrevocably are subjected to a higher moisture than plants located farther from the source of water. For the same reason the prior art apparatus is strongly restricted as concerns the maximum useful length of the apparatus. Further, the apparatus does not allow an interconnection of tubes to any length, in a bow formation or in curved loops.

The German patent publication No. DOS 26 10 384 discloses a similar apparatus, in which water is allowed to flow through the tube and to become sucked upwardly by means of a wick. This apparatus is disadvantageous in the same respects as the apparatus shown in the above mentioned U.S. patent. In particular also this last mentioned apparatus does not allow a placing of the irrigation tubes in bows and curved loops.

The U.S. Pat. No. 2,653,449 also discloses a similar apparatus, in which, rather than using a sucking wick, the tube is formed with an inner sleeve, or several short inner sleeve pieces, made from a soaking concrete material. The water is allowed fo flow freely in the tube and to be soaked up through the concrete material at the open parts of the outer tube. Also this apparatus does not allow a laying of the irrigation tubes in bows or curved loops.

The known types of apparatus utilizing only wicks or other soaking pieces of material for the distribution of water from a central source of water give an uneven and unsatisfactory distribution of water to the irrigated ground areas along the length of the tube.

It has previously been suggested to let the earth itself soak the water into the ground from irrigation tubes by arranging feet having a perforated bottom and extending down in the irrigation tube from the upper side of the irrigation tube, so that the bottoms of the feet appear immersed in the water in the tube, and by filling the feet with a cultivation substrate or with earth, for instance the same type of earth as the earth in which the plants/grow, whereby the water soaking is made similar to that found in nature itself. Such an apparatus is shown in the Swedish laid out publication No. 8304030-3 having the publication No. 455.751. Normally said apparatus gives a good water distribution to the irrigated areas, but also in this case there are difficulties in laying the tubes in bows or curved loops.

All of the above mentioned apparatus consequently are disadvantageous for enabling an irrigation of a large ground area, since said apparatus must necessarily either be worked in a substantial and complicated bending operation, for making holes for the water soaking means, for connection to a source of water etc., or they must be composed by several different pieces, namely small pieces of tube, intermediate connection pieces, end pieces, connection means for the water filling system etc.

The object of the invention therefore is to solve the problem of providing a simple, cheap and extremely easily handled apparatus which makes it possible to irrigate any large or small ground area, which can be set up by a very little number of standard pieces, which can be assembled without any time consuming and difficult handling operation and without the use of tools and without special connection pieces or end closings etc., which is formed so that it can be used both buried in the ground for irrigating any large ground areas and above the ground for so called free supported cultivation, which can be placed on/in non-level or sloping ground areas, and which is formed so that the water soaking is made such as to simulate the nature itself.

The method according to the invention is executed by manufacturing a tube or a hose of an at least fairly flexible material, like a plastic material, in desired lengths, and with opposed end portions adapted to be coupled with one another or with other lengths, which tube or hose is designed having one or more corrugated tube parts adapted to be interconnected by means of small flat or smooth tube pieces, or as an integral hose have one or more, preferably a large number of smooth tube parts, and corrugated tube parts located in between said smooth tube parts, along which corrugated tube parts the tube or hose can be bent to a desired curvature, the tube or hose is cut to the desired length, and it is foreseen that one tube end has, or is supplied with, a smooth tube part and that the opposite tube end has a corrugated tube part, or that the tube ends can be interconnected or coupled to each other or to any subsequent length of tube, the tube or hose is laid in the earth or above the ground in the intended formation, the corrugated tube end, or the end having the connection means, is introduced in the tube end having the smooth tube part, irrigation feet having a perforated bottom or any other water soaking means are introduced in holes of one of or several smooth tube parts and possibly also in holes provided in the corrugated tube parts, riser tubes or feet are filled with earth or with a cultivation substrate, the tube thus laid is covered with earth, or in case of free supported cultivation, pots or similar means are mounted on the upwardly projecting ends of the feet, water is provided in the tube, and the plants are allowed to grow in the earth above the tube or in the pots provided on top of the feet, which feet or riser tubes are filled with earth.

If desired the water tube or hose can be made in small units comprising at least one smooth and one corrugated part, or one corrugated tube part and separate smooth tube parts, whereupon the tubes or hoses are interconnected following each other and are bent to the desired formation.

Further characteristics of the invention and advantages thereof will be evident from the following detailed description in which reference will be made to the accompanying drawings.

BRIEF DESCRIPTION OF THE DRAWINGS

In the drawings

in FIG. 2 of an irrigation arrangement laid in the earth.

FIG. 11 is a diagrammatical cross section through an apparatus having a wick as a water soaking means, and FIG. 12 similarly shows an apparatus having a soaking stocking as the water soaking means.

FIGS. 13 and 14 diagrammatically show two different arrangments placed in a sloaping area.

DESCRIPTION OF THE PREFERRED EMBODIMENT

Figure 1:
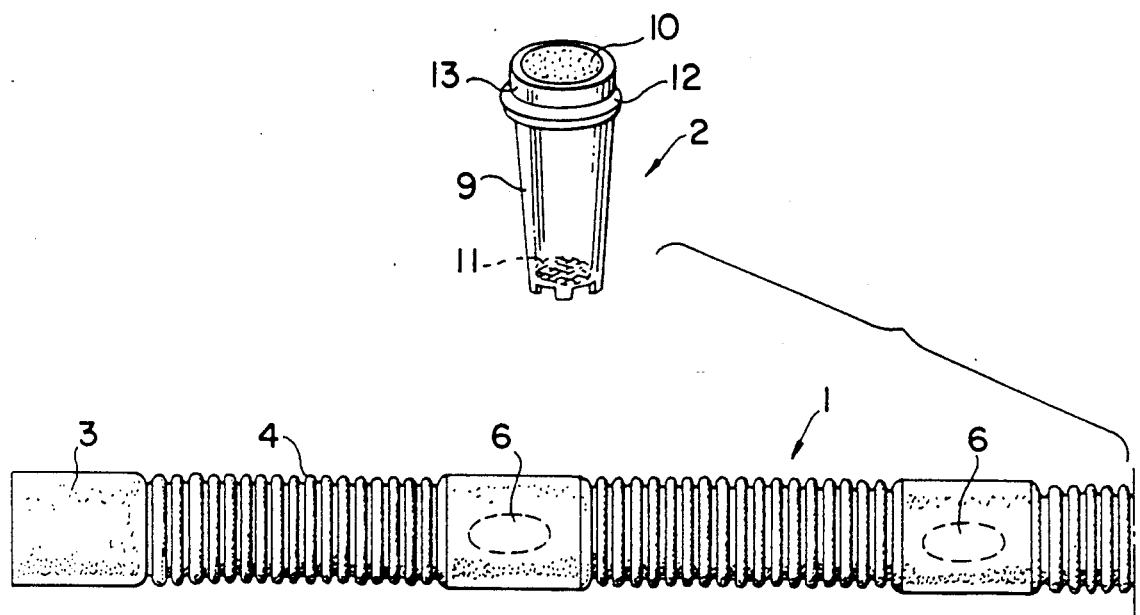
FIG. 1 is a top view of a part of a tube according to the invention.

The apparatus according to the invention generally comprises an irrigation tube 1 and several suction feet 2 as shown in FIG. 1.

Figure 4:
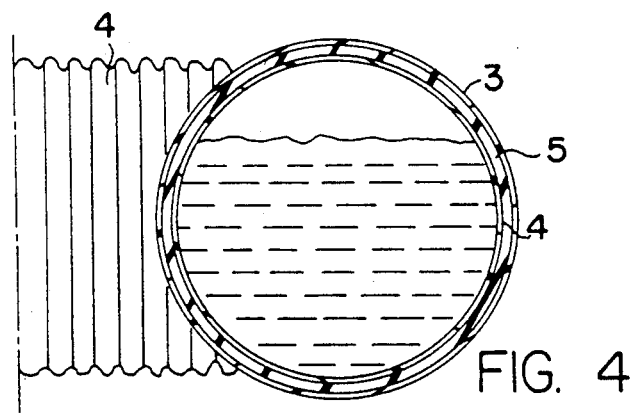

The irrigation tube 1 can be made of any flexible, plastic or elastic material like steel plate, aluminum plate or copper plate, of synthetic rubber or natural rubber, but preferably it is is extruded or pressed from a suitable synthetic resin material. In its most simple embodiment the tube comprises a smooth tube part 3 and a flexible tube part 4 which is corrugated or formed with spiral grooves for providing soft but still relatively strong bows or bendings. The smooth tube part 3 can be separate or can be integral with the corrugated tube part 4, and it should have an inner dimension which closely coincides with or is slightly larger than outer diameter of the corrugated tube part. The object thereof is that the flexible or corrugated tube part can be introduced in the smooth tube part thereby providing a relatively good seal between said parts. If a still better seal is to be established an O-ring 5, a sealing paste or any other sealing means can be arranged round one or several of the corrugation grooves, as indicated in FIG. 4.

In a preferred embodiment of the invention the irrigation tube is supplied in larger tube lengths comprising integral corrugated and smooth tube parts, and preferably having a large number of smooth tube parts 3 and intermediate flexible, especially groove formed or corrugated parts 4, whereby all smooth and corrugated parts have the same dimension, so that the tube or the hose can be cut anywhere, and having a sealed coupling between a smooth outer part 3 at one end of the tube and a corrugated outer part 4 at the opposite end of the tube, or having a sealed coupling between two sucessive tubes or hoses.

Some of the smooth parts 3, or all smooth part, and if desired also the corrugated parts, can have a hole or bore indication or impression 6 for expelling a round hole 7 in which a suction foot, a wick or a water supply riser tube 8 can be introduced while giving a reasonable sealing against the edges of the hole 7. The hole indication alternatively can be an indication for an elongated slot for introducing a plane wick. The hole indication may be a weakened hole line or a perforation of the surface of the smooth tube part, and eventually also of the corrugated tube part 4.

The suction foot is of a type which is known per se and it preferably comprises an upwarly slightly conically widened foot body having solid side walls 9, an opening 10 at the top for introducing earth or a cultivation substrate, and a perforated bottom 11, through which water enters the foot and reaches the earth and is soaked as far as to the ground or the cultivation pot above the suction foot 2. Also the suction foot is preferably made of a plastic material, and it is of such height as to project slightly over the upper edge of the irrigation tube. It may be preferred, in particular in case of cultivation in pots above the ground, to have the foot extend 5-10 mm or more above the upper edge of the irrigation tube, so that the pot fits steadily on the foot top. For this purpose the foot can be formed with an outer bead 12, as indicated in FIG. 1, which bead 12 acts as a shoulder against the tube hole 7. Above said bead 12 the tube may have a uniform diameter or even be upwardly slight conically converging for facilitating the mounting of the pots on the foot tops 13.

Figure 2:
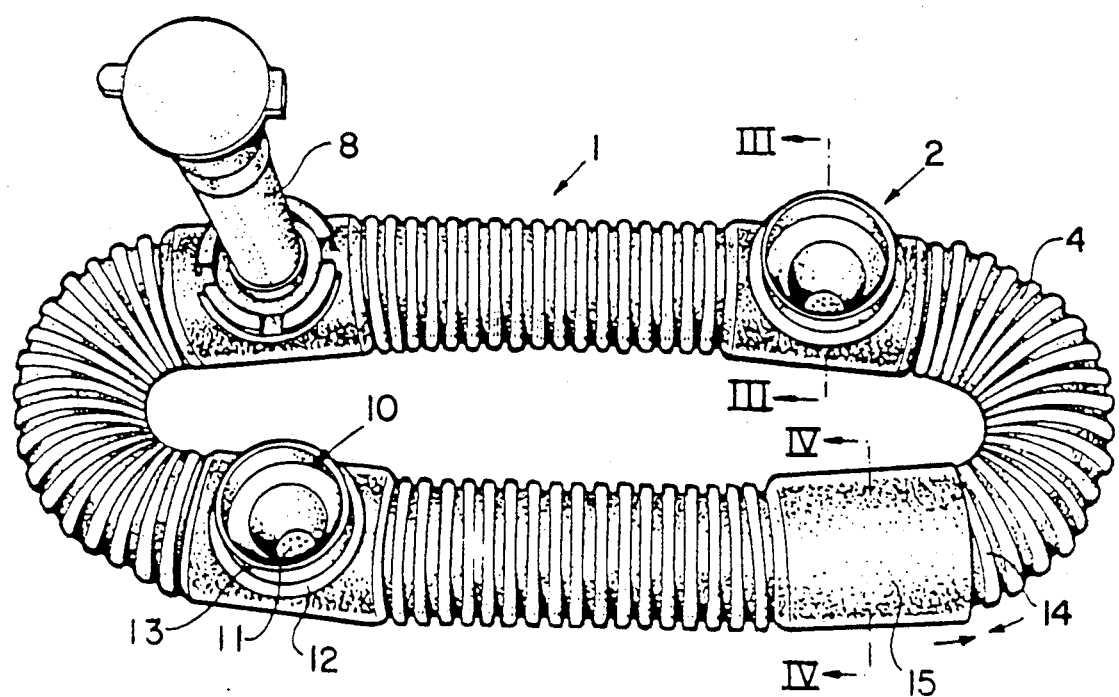
FIG. 2 shows a simple irrigation arrangement made by the tube of FIG. 1 and seen from above.

FIG. 2 shows a simple irrigation loop formed by a tube of the above described type and comprising four unit-lengths having four smooth parts 3 and four corrugated parts 4, and in which the corrugated tube part 14 at one end of the tube has been introduced in the smooth tube part 15 at the oppsite end of the tube. In some cases it is preferred not to provide a hole indication 6 in the smooth tube end 15, and not to expell an existing hole indication, especially in cases when the corrugated tube end 14 has been introduced so far into the smooth tube end 15 that it covers said hole indication. It is, possible to arrange for a sealing mechanism between the corrugated and the smooth tube ends outside the hole area of the smooth tube end 15, or to arrange a corresponding hole also in the corrugated tube end 14. It is easy to cut out holes in the tube parts by means of a knife where the material is thermoplastic.

Figure 3:
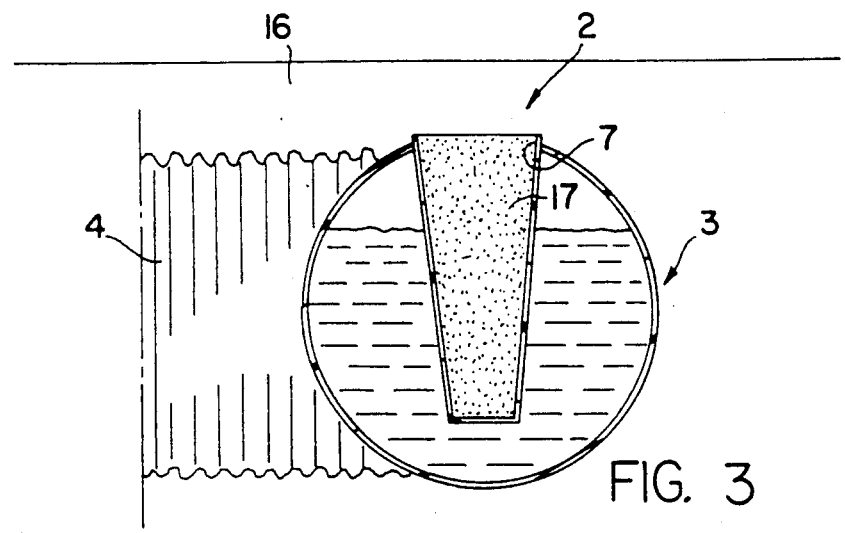
FIGS. 3 and 4 are cross section views along lines III—III and IV—IV resp.

FIG. 3 shows a cross section along line III—III of FIG. 2 through an apparatus according to the invention placed in the earth underneath the ground surface 16 and whereby the earth above, aside of and also underneath the irrigation tube is irrigated by the water which is soaked up and spread by the earth or the cultivation substrate 17 in the foot 2.

FIG. 4 shows a cross section along line IV—IV of FIG. 1. As evident an O-ring 5 is used to provide a good sealing between the end of the corrugated tube part 4 and the end of the smooth tube part 3.

Figure 5:
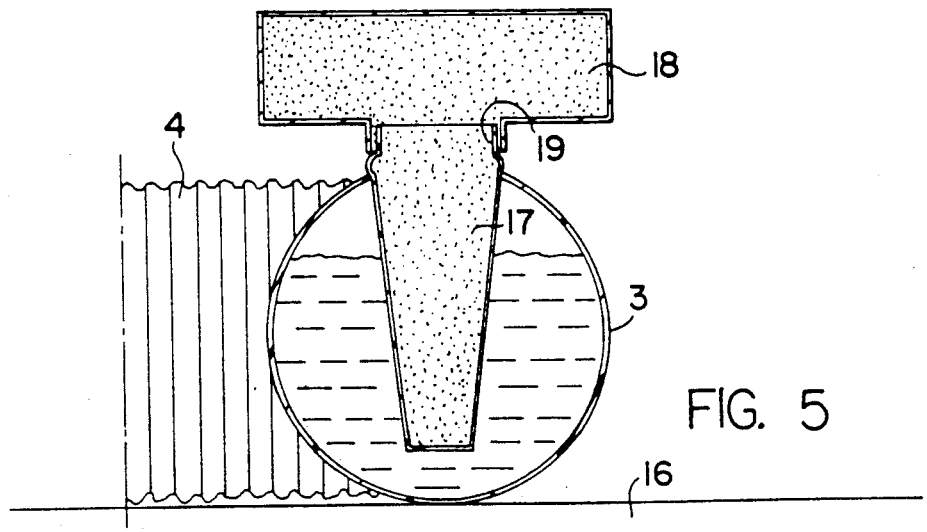
FIG. 5 is a cross section view of an irrigation arrangement, similar to that of FIG. 3 and laid above the earth for so called free supported cultivation.

FIG. 5 shows the possibility of using the apparatus above the ground for cultivation of plants in a pot 18 with the irrigation tube placed above the ground. This can be especially suitable when cultivating quick growing, and relatively sensitive, plants like lettuce etc. In such type of cultivation the suction foot or water soaking foot 2 is filled, as usual, with earth or cultivation substrate, and a pot 18 having a hole 19 at the bottom thereof is likewise filled with earth, peatmoss or any type of cultivation substrate, and the pot is put over the upper end 13 of the foot with the pot hole 19 thereof, and the plant is sown or planted. When the plant is ready to be delivered the entire pot is released from the foot and the plant is sent away for being sold, still in the pot.

A new pot is placed on the foot 2 which is still left in the irrigation tube, and a new cultivation cycle is started.

Figure 6:
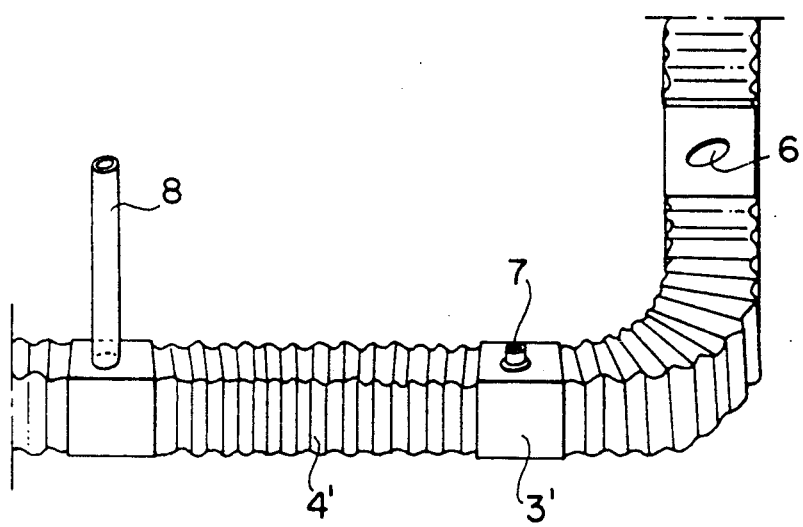
FIG. 6 shows an alternative shape of the irrigation tube according to the invention.

The irrigation tube may have any suitable cross section shape. In FIG. 1 there is shown a circular cross section shape, but in many cases it may be suitable to give the tube another cross section shape. An irrigation tube having for instance a square cross section shape, as shown in FIG. 6, may be suitable in that the tube maintains its position while being laid and after it has been laid. A circular tube may rotate so that the water level will vary in various parts of the tube. FIG. 6 also shows a preferred way of arranging a water filling tube 8 on suitable places in the holes 6 which can be provided in the smooth tube parts 3' and eventually also in the corrugated tube parts 4'.

In some cases it may be difficult to have the irrigation tube lie in complete contact with ground before filling earth over the irrigation system, since the corrugated tubes may rotate, or they may bow upwards or downwards, partly depending on the elastic inner strains of the flexible material thereof. In some cases it may also be difficult to exactly dimension the length of the irrigation tube.

Figure 7:
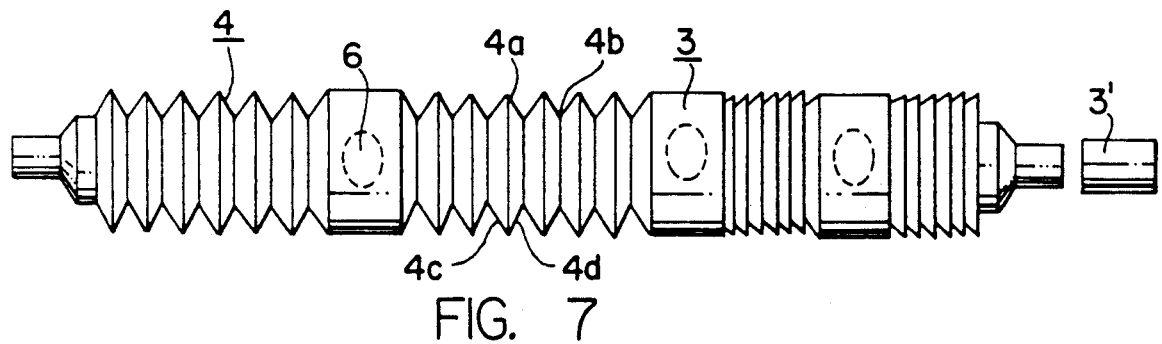
FIG. 7 shows a still further alternative embodiment of the irrigation tube of the invention.
Figure 8:
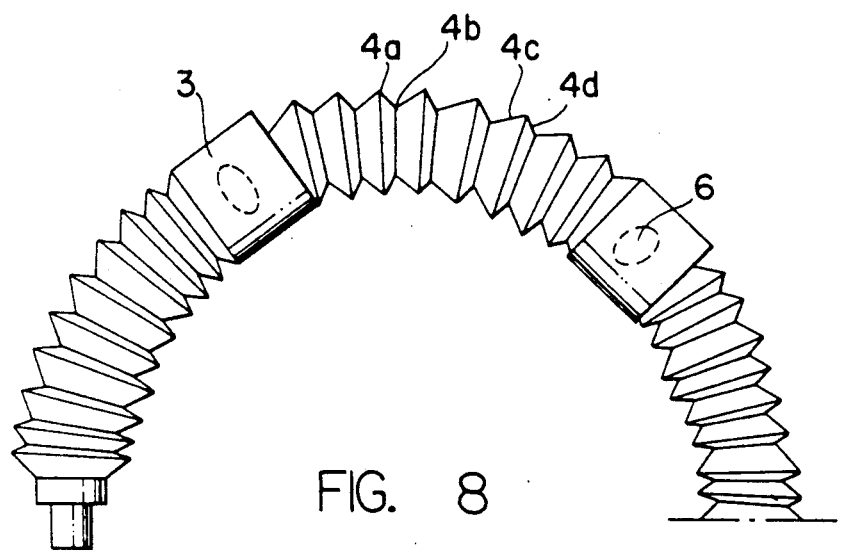
FIG. 8 shows the irrigation tube of FIG. 7 turned to a half-circular shape.
Figure 9:
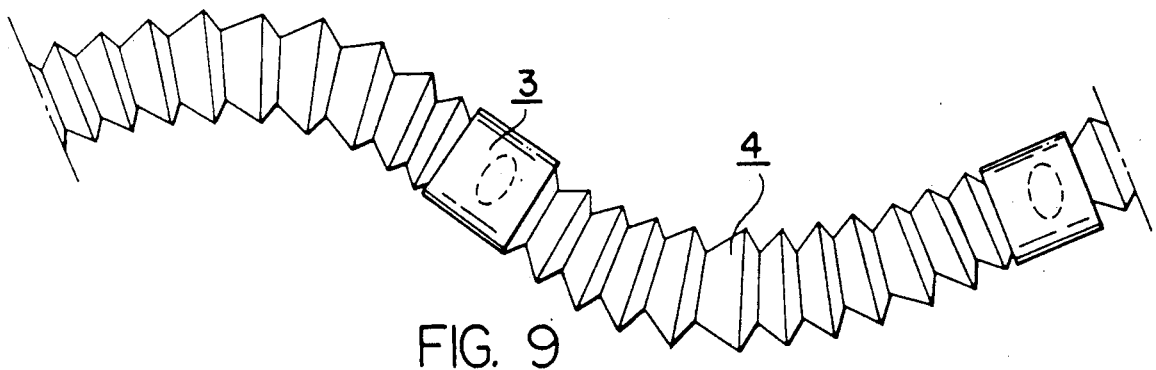
FIG. 9 shows the tube of FIG. 7 turned to S-shape.

FIGS. 7, 8 and 9 disclose an irrigation tube for eliminating such problems and which is designed so that the tube can be bent into any desired shape which shape is maintained ever after, and so that the length of the tube can be adjusted within wide ranges.

The corrugated part 4 of the tube is formed with relatively sharp outer and inner bendings 4a and 4b resp. between which there are formed inclined but substantially flat peripheral tube sides 3c and 4d. The inclination angle of the tube sides 4c and 4d may be the same or different and should be calculated with respect to the elasticity of the tube material, so that one side, for instance side 4d can be partly or completely pressed and snapped to a position inside of the other side 4c. This position is maintained depending on the elasticity and the strains of the material. The inclination angle of the sides may be for instance 20°-60° with respect to a transverse axis of the tube. Preferably one of the sides 4d has a steeper inclination angle than the other one to guarantee that always said one side is introduced in said other side. In the embodiment illustrated in FIG. 7 the steeper side 4d has an angle of about 25° whereas the other side 4c has an inclination of about 50°.

In FIG. 7 the left part of the tube is illustrated in its at least partly expanded condition whereas the right side is shown in its compressed condition with the sides 4d located inside of the sides 4c, and it is obvious that the tube in its compressed condition has about half the length of the tube in its normally expanded condition. By compressing the tube partially it can be adjusted to any desired length between 50-100% of the expanded length.

In the illustrated case there is formed a connection tube part at each end of the irrigation tube. Tubes can be interconnected by separate connection tubes engaging said connection parts.

FIG. 8 shows part of a tube part according to FIG. 7 bent to a U-bow, and FIG. 9 similarly shows a tube part bent to S-shape. It should be noted that the tube part can be bent in all directions, at the same time both up-down and sideways, whereby the tube becomes exactly adapted to any shape of the substrate on which the tube is laid, and said 3-dimensionally bent tube maintains its shape depending on the elastic snap action of the side 3d within or under the side 4c.

Figure 10:
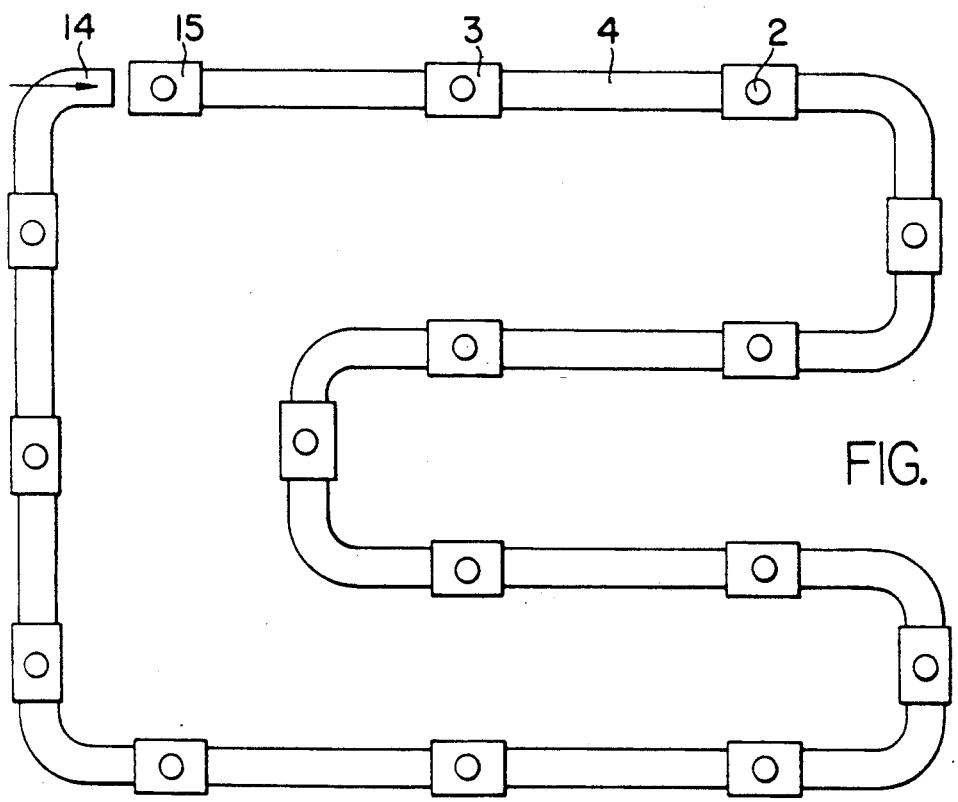
FIG. 10 is a top view of an irrigation arrangement for irrigation of a large ground area.

FIG. 10 shows an irrigation arrangement according to the invention adapted to irrigate a large ground area and formed as a closed loop consisting of one or more irrigation tubes which are interconnected to form a closed irrigation system, and whereby the ends 14 and 15 are shown in a position just before being interconnected.

FIG. 11 shows a longitudinal vertical section through an apparatus in which the smooth tube parts 21 and the corrugated tube parts 22 respectively are separate from each other and in which three corrugated tube parts 22 have been connected to each other by means of two smooth tube parts 21. For soaking water from the irrigation tube system there is provided a wick 23 in the form of a strip of a suitable soaking material the two ends of which are introduced in two adjacent smooth tube parts 21 formed with slots having a suitable dimension for the wick. The wick 23 thereby is placed in an inversed U-shape.

In the apparatus of FIG. 12 a stocking 24 of a soaking material is mounted outside a water filling tube 8 for soaking water and transmitting same into the earth.

FIGS. 13 and 14 disclose a method of laying an irrigation system consisting of tubes according to the invention also in a sloaping ground area. For this purpose there is used smooth tube parts 25 having an inner screen plate 26 extending from the bottom of the tube part 25 as far as to between ½ and ¾ of the height of the tube part, and which acts as a stop means for flooding of water to the adjacent lower tube part. In FIG. 10 the tube parts are laid mainly horizontally but with an S-bow adjacent a smooth tube part and with a water filling tube 8 at the uppermost smooth tupe part. The dotted lines diagrammatically illustrate that, also in this case, a closed irrigation loop can be laid including bows and turns, as mentioned previously.

In the embodiment of FIG. 14 the tube parts are placed inclined. This is quite possible thanks to the screen plates or dams 26 which make the water stay in the respective tube part and to guarantee a certain water depth at the smooth tube parts 25 in which water soaking means like suction feet or wicks are normally introduced.

The invention is utlized as follows:

smooth tube elements 3 and corrugated tube elements 4, or alternatively an irrigation tube comprising alternating smooth tube parts 3 and corrugated tube parts 4 are manufactured as an integral unit, for instance in endless lengths;

the tube is cut into the intended length and it is foreseen that one end has a corrugated part 14 and the other end has a smooth part 15, or that both tube ends are otherwise formed with means for being interconnected by means of a connection element. The tube consisting of smooth tube parts and corrugated tube parts is laid in the intended formation so as to cover the area to be irrigated, and the ends of the tube are interconnected, for instance the corrugated tube end 14 is introduced in the smooth tube end 15 under sealed condition, as indicated in FIG. 10;

a hole 6 is pressed out in each, or at lease some of the hole indications of the smooth and eventually also the corrugated tube parts;

a water supply tube (8 in FIG. 6) is introduced in one of or several ones of the holes, and in other holes 6 water soaking feet 2, or wicks (23 of FIG. 11), or soaking stockings (24 of FIG. 12) are introduced;

the soaking feet 2 are filled with earth or with a cultivation substrate;

the tube is laid under (or above) the ground surface;

earth is filled to a suitable height over the tubes, for instance 5–20 cm above the upper end of the tubes;

water and generally also a fertilizer and other cultivation promoting and illness preventing substances are filled in the irrigation tube system over the filling tube 8;

and plants are sown or planted in the earth above the irrigation tube (or in pots mounted on the water soaking feet).

In case of cultivation of plants above the ground, so called free supported cultivation, the irrigation tube system is laid on flat or uneven or inclined ground as shown in FIGS. 13 and 14, wicks or water soaking feet are mounted in the irrigation tubes, the water soaking feet are filled with earth, and water is filled to a suitable level in the irrigation tube. In case of using water soaking feet pots 18 having bottom holes 19 are mounted on the tube end 13 of the soaking feet, and seeds are sown, or plants are planted, in the pot. When the plant is ready the entire pot 18 with the plant is removed and is substituted by a new pot.

Normally it is possible to arrange a complete irrigation base by means of one and the same irrigation tubes, but in some situations it may be desired to arrange a branch connection, for instance for enabling filling of water in common for two or more different irrigation systems. For this purpose it is possible to use a T-connection tube, and Y-connection tube or a similar means, which connection means at one end has a corrugated tube part (or another connection means) for connecting said tube end to the smooth tube end 15, and in its opposite end has two smooth tube parts.

I claim:

1. An irrigation system for growing plants in individual pots, said system comprising:
   (a) at least one elongated hose, said hose defining an elongated internal passageway, and said hose including longitudinally spaced flexible segments (4,4) such that the hose can be laid in a trench of serpentine shape, said hose having non-flexible segments (3,3) between said spaced flexible segments (4,4), at least some of said non-flexible segments defining upwardly openable portions (2 or 6), coupling means for connecting the opposed ends of said elongated hose to provide a closed water storage system,
   (b) frusto-conically shaped imperforate riser tubes, each of said tubes having a bottom end that is perforated and a top end which is open so as to receive a pot or the like, said tubes provided in at least some of said upwardly openable portions of said non-flexible hose portions,
   (c) said perforated bottom end of said tube provided the bottom interior boundary of said non-flexible hose segment so that when said tube is filled with a substrate capable of wicking water upwardly inside the tube a pot placed on the open top of said tube will be irrigated.

2. Apparatus or system according to claim 1 wherein said bottom ends of said tubes are provided with feet so as to assure a desired spacing between the perforated bottom end of the tube and the interior bottom boundary of said non-flexible hose segment.

3. The system according to claim 2 wherein said coupling means for connecting the opposite ends of said elongated hose more particularly comprise mating end portions of said hose, said non-flexible portion having an internal size that adapts it to fit over the external end portion of the flexible hose segment.

4. The system according to claim 3 wherein said flexible hose segments and said non-flexible hose segments are fabricated from a plastic material, and wherein said flexible portions have a corrugated configuration that permits a degree of axial compression or expansion of the flexible segments to facilitate laying of the hose in a trench of serpentine shape.

5. The system according to claim 4 wherein said hose is of generally circular configuration, and wherein said internal passageway is of generally cylindrical cross section.

6. The system according to claim 5 wherein said hose has a generally rectangular cross section, and wherein said internal passageway has a generally flat bottom interior boundary.

7. The system according to claim 6 further characterized by dams 26, 26 placed inside certain of said non-flexible hose segments to provide a reservoir of water upstream of each of said dams in the event that the serpentine shape trench in which the hose is laid has a vertical drop of sufficient slope so as to require such damming of the water at those locations for said non-flexible hose segments which are above the lowermost such segments.

8. The system according to claim 7 wherein a plurality of elongated hoses are provided to define a closed irrigation system.

* * * * *